(12) United States Patent
Alyaqout (10) Patent No.: US 10,913,476 B1
(45) Date of Patent: Feb. 9, 2021

(54) SMART SHOPPING CART (71) Applicant: Reem Amam Alyaqout, Safat (KW)

(72) Inventor: Reem Amam Alyaqout, Safat (KW)

( * ) Notice: Subject to any disclaimer, the term of this patent is extended or adjusted under 35 U.S.C. 154(b) by 0 days.

(21) Appl. No.: 16/884,965

(22) Filed: May 27, 2020

(51) Int. Cl.
*B62B 3/02* (2006.01)
*B62B 5/00* (2006.01)
*B62B 3/14* (2006.01)

(52) U.S. Cl.
CPC ............ *B62B 3/142* (2013.01); *B62B 3/02* (2013.01); *B62B 3/146* (2013.01); *B62B 3/1416* (2013.01); *B62B 3/1472* (2013.01); *B62B 5/00* (2013.01)

(58) Field of Classification Search
CPC ....... B62B 3/142; B62B 3/1416; B62B 3/146; B62B 3/02; B62B 3/1472; B62B 3/1408; B62B 3/027; B62B 5/00
USPC ............................ 280/33.992, 33.991, 33.997
See application file for complete search history.

(56) References Cited

U.S. PATENT DOCUMENTS

| 5,158,310 | A | * | 10/1992 | Tannehill | ............... | B62B 3/1408 |
| | | | | | | 186/62 |
| 5,203,579 | A | * | 4/1993 | Lipschitz | ............... | B62B 3/1472 |
| | | | | | | 248/129 |
| 5,250,789 | A | | 10/1993 | Johnsen | | |
| D406,430 | S | * | 3/1999 | Ross | .............................. | D34/17 |
| 6,032,127 | A | | 2/2000 | Schkolnick et al. | | |
| 6,435,407 | B1 | | 8/2002 | Fiordelisi | | |
| 6,637,533 | B2 | | 10/2003 | Bertone | | |
| 6,749,204 | B2 | * | 6/2004 | Werner | ................. | B62B 3/1472 |
| | | | | | | 224/411 |
| 7,566,069 | B1 | * | 7/2009 | Ortega | .................... | B62B 3/027 |
| | | | | | | 280/32.6 |
| D765,447 | S | * | 9/2016 | Barham | ........................ | D6/682 |
| 10,232,767 | B2 | * | 3/2019 | Leslie | .................... | B60Q 5/001 |
| 2002/0101047 | A1 | * | 8/2002 | Drury Chesser | ......... | B62B 3/10 |
| | | | | | | 280/47.35 |
| 2015/0039465 | A1 | | 2/2015 | Elberbaum | | |
| 2016/0082999 | A1 | * | 3/2016 | Obradors Gomez | ... | B62B 3/106 |
| | | | | | | 280/47.34 |
| 2016/0258763 | A1 | | 9/2016 | High et al. | | |
| 2017/0174242 | A1 | | 6/2017 | Bacallao | | |
| 2017/0186073 | A1 | | 6/2017 | Bryan et al. | | |
| 2019/0272400 | A1 | * | 9/2019 | Naito | .................... | B62B 3/1412 |

(Continued)

FOREIGN PATENT DOCUMENTS

| CN | 202806824 U | 3/2013 |
| CN | 203142736 U | 8/2013 |
| FR | 2867436 A1 | 9/2005 |

*Primary Examiner* — John D Walters
(74) *Attorney, Agent, or Firm* — Nath, Goldberg & Meyer; Richard C. Litman (57) ABSTRACT

The smart shopping cart is a cart for storing and transporting groceries or other articles, having a hanger pole rising from the basket for hanging bags and the like. The smart shopping cart includes a basket and a plurality of wheels secured to a lower surface of a lower wall of the basket. A lower end of a hanger pole is mounted to an upper surface of the lower wall of the basket, and the hanger pole extends upwardly. At least one article hanger is mounted on the hanger pole. A lower end of a support is mounted to a rear end of the basket, and a first display panel is mounted on the upper end of the support. A second display panel is mounted on a front end of the basket, and a handle for pushing the smart shopping cart is attached to the upper end of the support.

4 Claims, 6 Drawing Sheets

(56) References Cited

U.S. PATENT DOCUMENTS

2020/0031380 A1* 1/2020 Kadiyala ............... B62B 5/0069
2020/0108851 A1* 4/2020 Hagen ................... B62B 3/1464

* cited by examiner

SMART SHOPPING CART

BACKGROUND

1. Field

The disclosure of the present patent application relates to carts, and particularly to a smart shopping cart with an additional hanger in the basket for use in shopping malls and the like.

2. Description of the Related Art

In general, shopping carts have not changed much over the past years in order to keep up with shopping malls evolution or the modern internet-of-things era. Typical shopping carts include a basket mounted on four wheels with a relatively large overall size, with no consideration for aesthetic design or sophistication, nor including modern interactive features or additional storage and carrying accessories. In other words, the traditional shopping carts are not readily adaptable to trends in either shopping or technology. For example, traditional shopping carts are not adapted for the needs of the modern shopper, who will typically be carrying a smartphone, have the option to drink a cup of coffee while shopping, and who will be accustomed to having instant access to information through smartphones, the internet-of-things, smart displays and the like.

Additionally, traditional shopping carts are not readily usable by the disabled. Thus, a smart shopping cart solving the aforementioned problems is desired.

SUMMARY

The smart shopping cart is a cart for storing and transporting groceries or other articles, with an additional hanger for hanging bags and the like. The smart shopping cart includes a basket having at least one sidewall and a lower wall, and a plurality of wheels secured to a lower surface of the lower wall of the basket. A hanger pole, having opposed upper and lower ends is provided, the lower end being mounted on the lower wall of the basket so that the hanger pole extends upward from the basket. At least one article hanger, such as a peg, a clasp, a hook, or the like, is mounted on the hanger pole.

A lower end of a support is mounted to a rear end of the basket, and a first display panel is mounted on the upper end of the support. The support may be height adjustable for accommodating a variety of different users having different heights. The support may be, e.g., a telescopic rod. The first display panel may be liquid crystal display (LCD), a touchscreen, a tablet computer, or the like. A control module may be mounted to the basket and the first display panel may be in communication therewith for providing the user with a computerized display and interface for providing the user with an interactive experience.

A second display panel is mounted on a front end of the basket and may also be in communication with the first display panel and the control module. The second display panel may be pivotally mounted on the front end of the basket in order to prevent damage thereto if the second display panel collides with an object. A handle extends from the upper end of the support for pushing the smart shopping cart.

These and other features of the present disclosure will become readily apparent upon further review of the following specifications and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
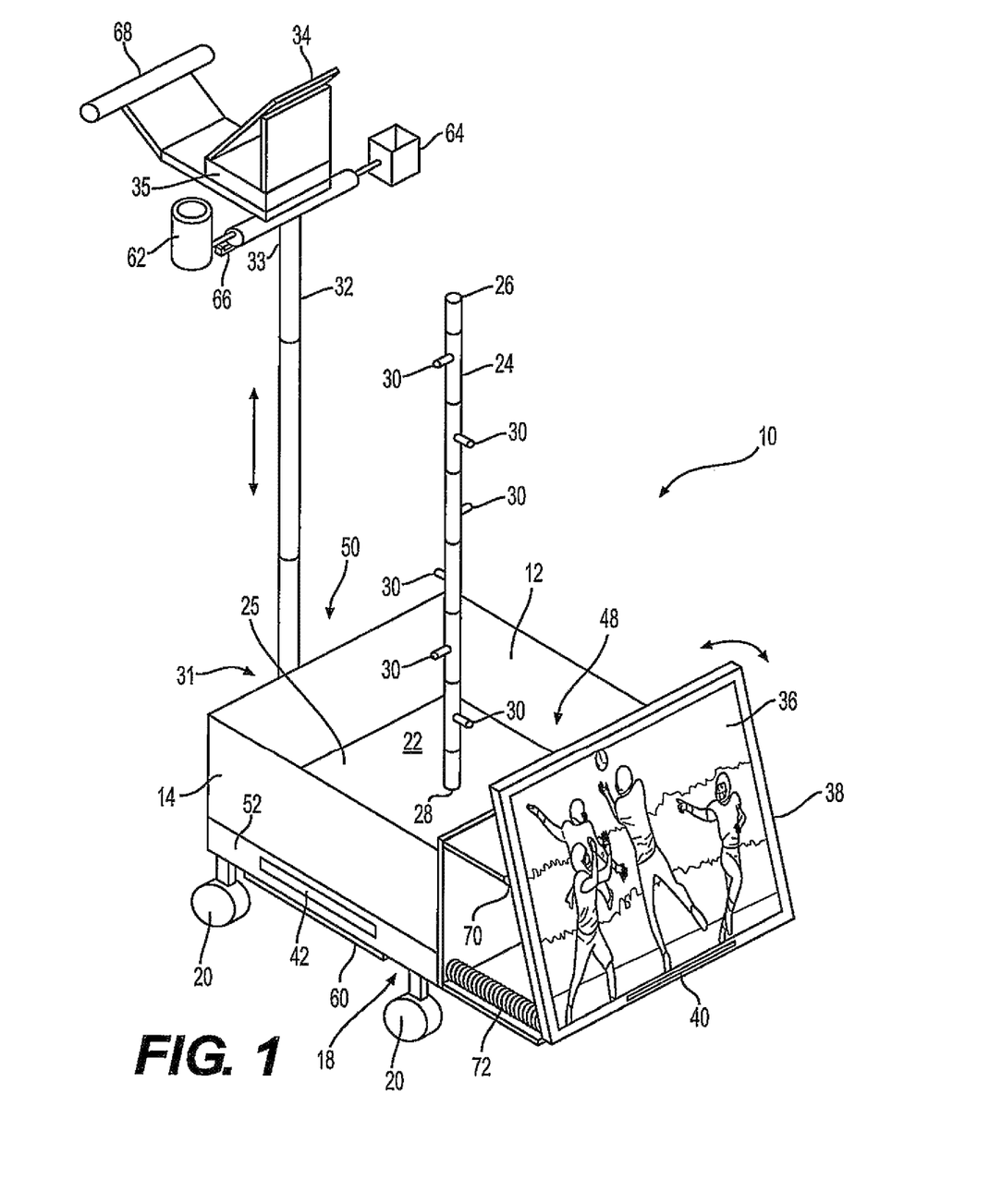
FIG. 1 is a perspective view of a smart shopping cart.
Figure 2:
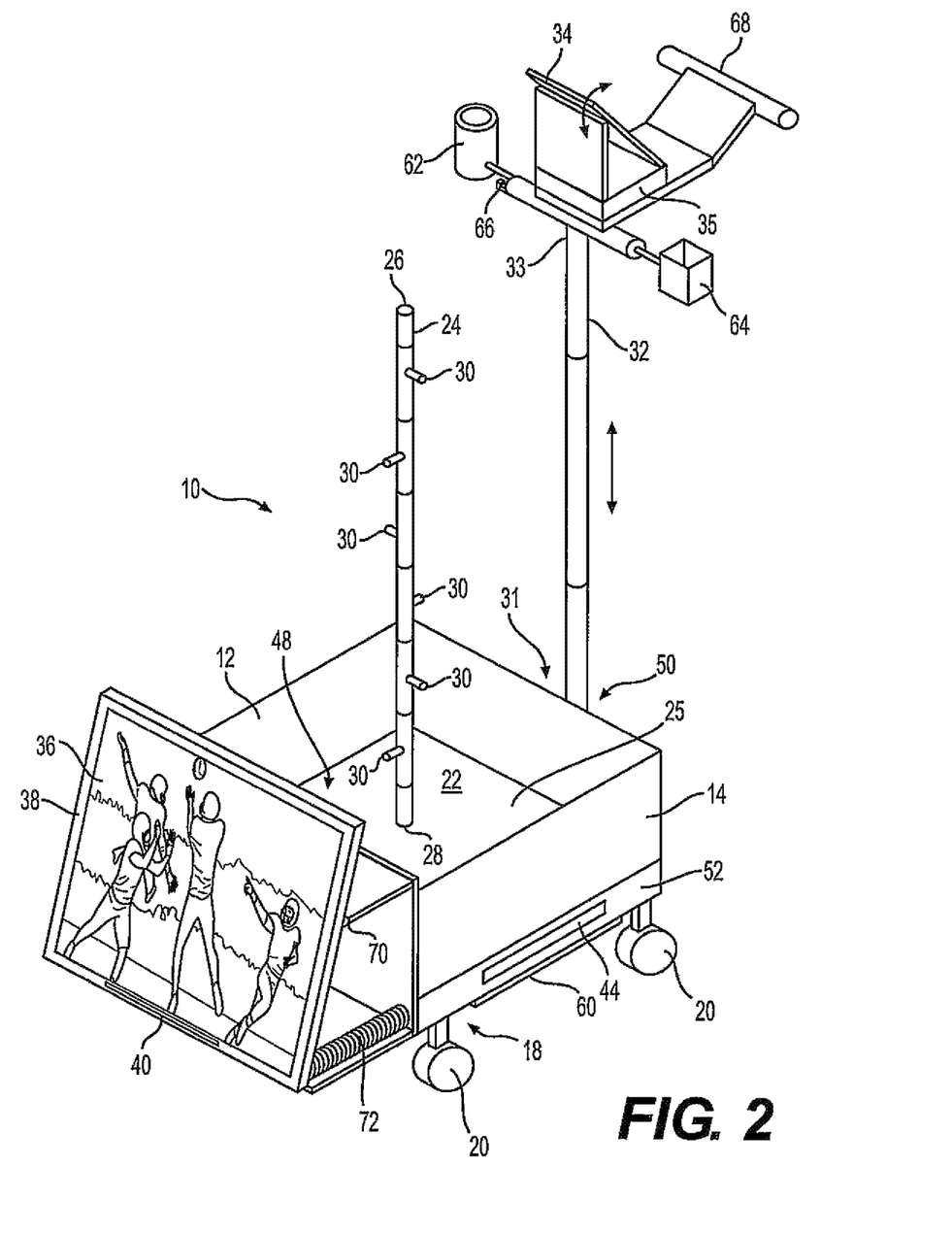
FIG. 2 is another perspective view of the smart shopping cart of FIG. 1.
Figure 3:
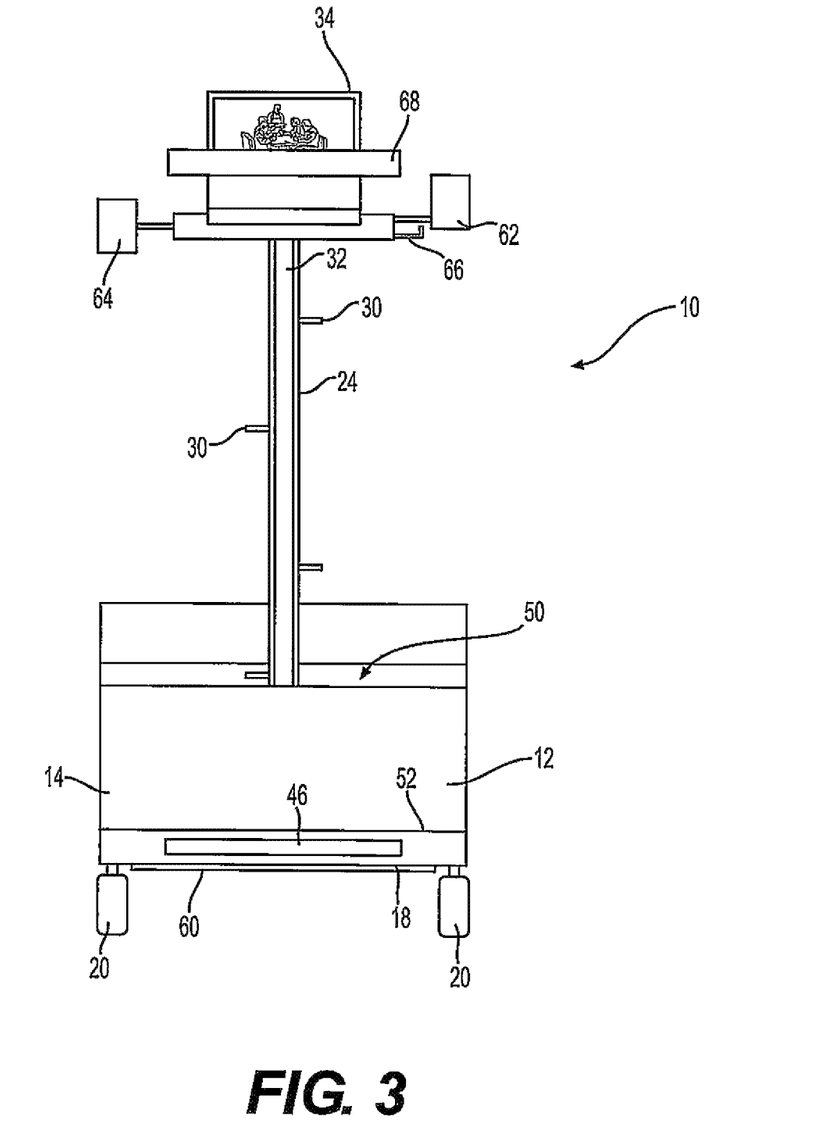
FIG. 3 is a rear view of the smart shopping cart of FIG. 1.

The smart shopping cart 10 is a cart for storing and transporting groceries or other articles, the cart 10 having an additional hanger for hanging bags and the like. As shown in FIGS. 1-3, the smart shopping cart 10 includes a basket 12 having at least one sidewall 14 and a lower wall 25. Although the basket 12 is shown as having a substantially rectangular shape with four sidewalls, it should be understood that the basket 12 shown in FIGS. 1-3 is exemplary only. The basket 12 may have any desired overall shape and relative dimensions.

A plurality of ground-engaging wheels 20 are secured to a lower surface 18 of the lower wall 25 of basket 12. Although four such wheels are shown, it should be understood that any suitable number of wheels for supporting and transporting the basket 12 may be used. Further, it should be understood that any suitable type of wheels may be utilized, such as casters or the like, and that the wheels 20 shown in FIGS. 1-3 are shown for exemplary purposes only.

Figure 5A:
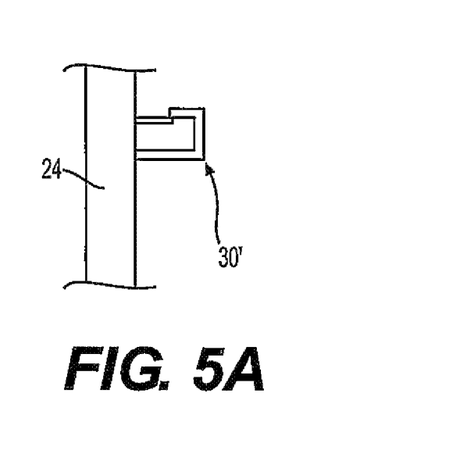
FIG. 5A is a side view of an alternative embodiment of an article hanger used with the smart shopping cart of FIG. 1, shown in a closed configuration.
Figure 5B:
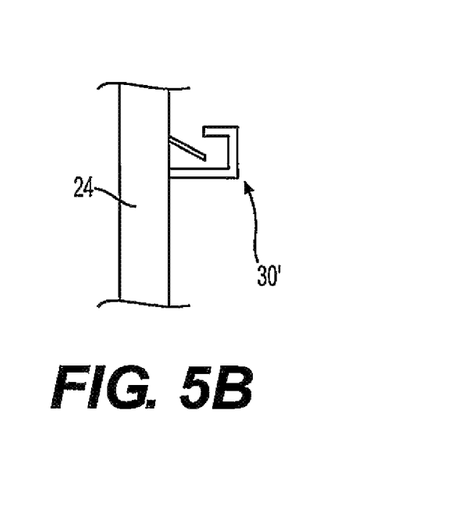
FIG. 5B is a side view of the article hanger of FIG. 5A, shown in an open configuration.
Figure 6:
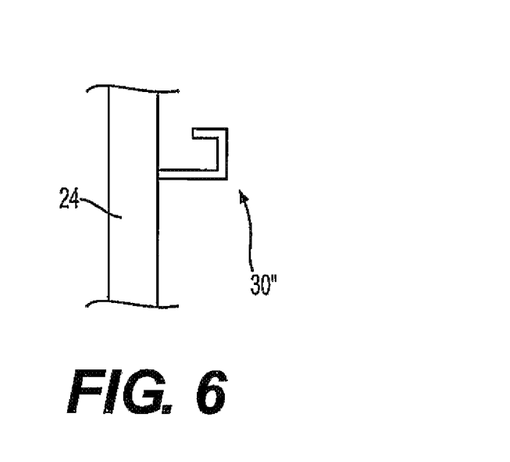
FIG. 6 is a side view of another alternative embodiment of an article hanger used with the smart shopping cart of FIG. 1.

A hanger pole 24 having opposed upper and lower ends 26, 28, respectively, is mounted in the basket 12, the lower end 28 being mounted to an upper surface 22 of the lower wall 25 of the basket 12, such that the hanger pole 24 extends upward from the floor of the basket 12. In FIGS. 1 and 2, the hanger pole 24 is shown mounted substantially centrally with respect to the upper surface 22 of lower wall 25. However, it should be understood that the hanger pole 24 may be positioned at any desired location within the basket 12. Further, it should be understood that the overall dimensions and configuration of the hanger pole 24 are shown for exemplary purposes only. At least one article hanger is mounted on the hanger pole 24. In the example of FIGS. 1 and 2, pegs 30 are shown mounted on hanger pole 24 for supporting shopping bags or the like. It should be understood that any suitable type of article hangers may be used. FIGS. 5A and 5B illustrate another example in which the article hanger(s) 30' mounted on the hanger pole 24 is in the form of a clasp, similar to that found on keychains and the like. In the further example of FIG. 6, article hanger 30" is a hook.

A lower end 31 of a support 32 is mounted to a rear end 50 of the basket 12. It should be understood that the overall dimensions and configuration of the support 32 are shown in FIGS. 1-3 for exemplary purposes only. A first display panel 34 is mounted on the upper end 33 of the support 32. The first display panel 34 may be supported on any suitable type of mount, such as the exemplary mount 35, which may be angularly adjustable. The support 32 may be height adjustable for accommodating a variety of different users having different heights, or to be used by shoppers in wheelchairs. For example, the support 32 may be a telescopic rod. The first display panel 34 may be a liquid crystal display (LCD), a touchscreen, a tablet computer or the like. A control module 52 may be mounted to the basket 12 and the first display panel 34 may be in communication therewith for providing the user with a computerized display and interface for an interactive experience.

Figure 4:
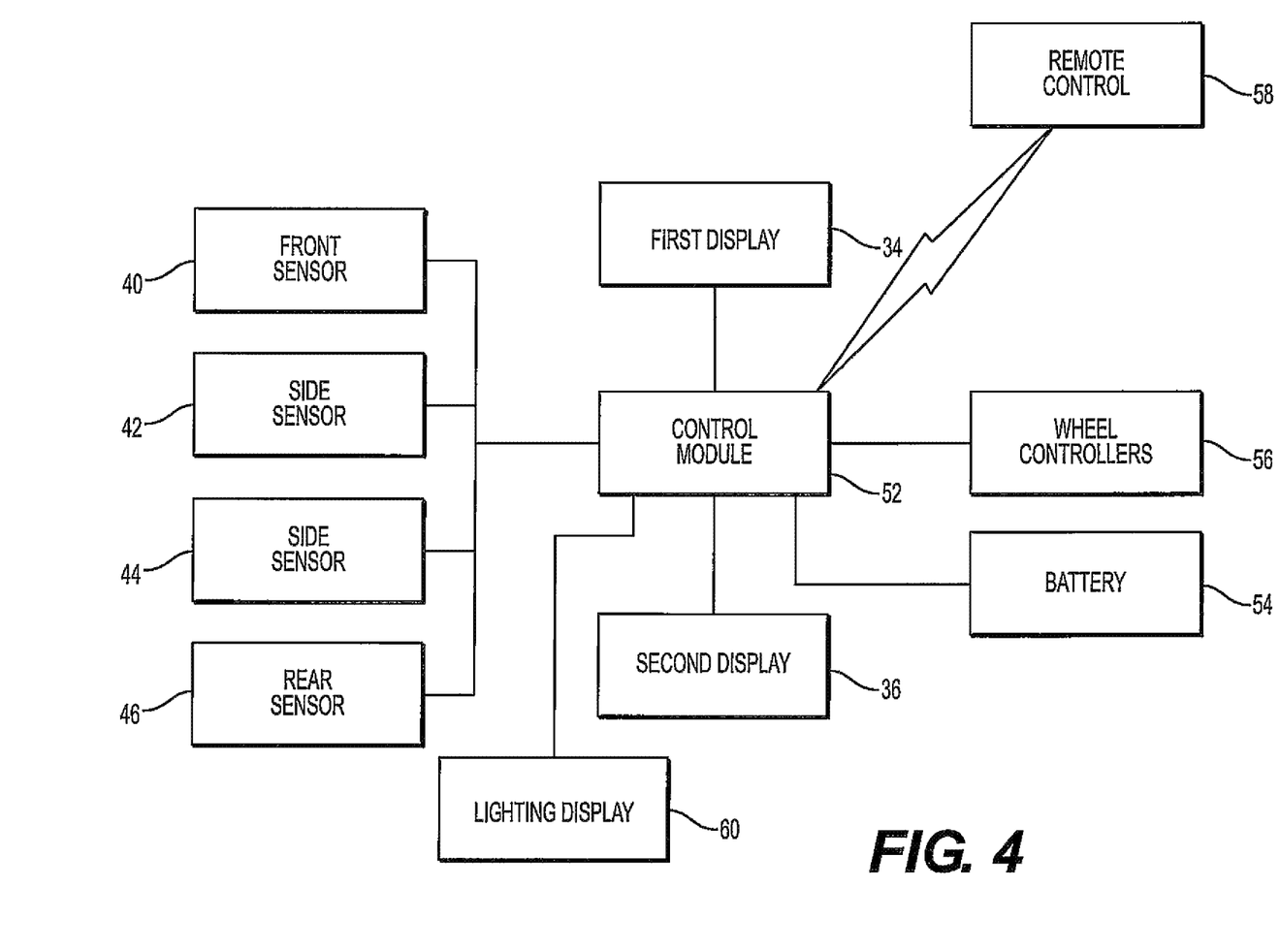
FIG. 4 is a block diagram illustrating electrical components of the smart shopping cart of FIG. 1.

The control module 52 may be a portable computer, control circuitry, a processor, a programmable logic controller or the like. As shown in FIG. 4, control module 52 may be connected to, or be integrated with, a rechargeable battery 54. The rechargeable battery 54 may be recharged through connection with an external power supply or may be recharged using a generator coupled with wheels 20, allowing pushing of smart shopping cart 10 to provide charging current.

A second display panel 36 is mounted on a front end 48 of the basket 12 and may also be in communication with the control module 52 and the first display panel 34. As shown in FIGS. 1 and 2, the second display panel 36 may be pivotally mounted on the front end 48 of the basket 12, via hinge(s) 70 or the like, in order to prevent damage thereto if the second display panel 36 strikes an object. Further, a spring 72 or the like may be provided for providing shock absorption in the event of a collision between second display panel 36 and an object. Further, a border 38, formed from foam rubber, plastic or the like, may be provided for framing the second display panel 36 to provide further protection therefor. The second display panel 36 may be a liquid crystal display (LCD) or the like. The second display panel 36 may be used to display advertising, promotions, promotional challenges, educational material and the like. The second display panel 36 may also be provided with one or more speakers, allowing for audio output.

At least one motion sensor may further be provided in order to prevent or minimize collisions. In the embodiment of FIGS. 1-4, the basket 12 is provided with a front sensor 40, a pair of side sensors 42, 44, and a rear sensor 46. Each of the sensors 40, 42, 44, 46 is in communication with the control module 52, and the control module 52 may be in further communication with wheel controllers 56, which are coupled with wheels 20. Wheel controllers 56 may include braking units, steering units, and may further be provided with motors, actuators or the like for driving the wheels 20 to rotate. It should be understood that any type of motion and/or object sensors may be utilized. Similarly, it should be understood that any suitable type of wheel controllers may be used.

Using the first display panel 34, the user may instruct the control module 52 to either disengage the wheel controllers 56, allowing for conventional pushing of the smart shopping cart 10, or may engage the wheel controllers 56 to put the smart shopping cart 10 into a self-driving mode. Additionally, as shown in FIG. 4, control over the mode and driving of the smart shopping cart 10 may also be accomplished through the use of a remote control 58 which communicates, either wirelessly or through wired communication, with the control module 52.

The motion sensors 40, 42, 44, 46 send signals to the control module 52 for braking the wheels 20 with a smooth braking deceleration if other shoppers, objects or the like are detected in the path of smart shopping cart 10, or if the remote control 58 is separated from the smart shopping cart 10 by a threshold distance (e.g., the user of the smart shopping cart 10, who is carrying the remote control 58, moves outside of a preset range with respect to the smart shopping cart 10). Further, in self-driving mode, the user may program a desired destination into the first display 34 (in communication with the control module 52), and the wheel controllers 56 may be used to drive to the destination and then stop the smart shopping cart 10 once the destination is reached. The remote control 58 may be provided with a "stop" button for instantly braking the wheels 20, as well as having directional controllers for steering the smart shopping cart 10 via the wheel controllers 56. It should be understood that any suitable type of remote control device may be used, including remote controls adapted for wearing by the user, such as through attachment to a finger ring, bracelet or the like. Additionally, the self-driving mode may be programmed to only actuate if the remote control 58 is physically separated from the smart shopping cart 10.

Navigation in the self-driving mode may be accomplished using pre-programmed routes and/or routes calculated using an associated locating system, such as a global positioning system (GPS) receiver or the like. Using the first display panel 34, shoppers may be provided with maps, shopping options (clothing stores, restaurants, toy stores, etc.) or the like, and may then be provided with navigating directions and/or the control module 52 may be used to automatically navigate the smart shopping cart 10 towards the desired destination. The first display panel 34 may also be provided with one or more speakers, allowing for audio output.

A handle 68 is further mounted on the upper end 33 of the support 32 for pushing the smart shopping cart 10. It should be understood that the handle 68 is shown for exemplary purposes only and may have any desired overall configuration and dimensions. It should be further understood that any desired type of additional accessories may be added to the smart shopping cart 10. For example, a cup holder 62, receptacle 64 and auxiliary hanging hook 66 are shown mounted on the upper end 33 of the support 32. It should be understood that the appearance, overall shape, configuration and relative dimensions of the cup holder 62, receptacle 64, and auxiliary hanging hook 66 are shown for exemplary purposes only. For example, the receptacle 64 may be dimensioned and configured for receiving a conventional smartphone, and may further be provided with a number of connectors for charging different types of smartphones through communication with the battery 54. The receptacle 64 may also include a separate rechargeable battery.

Additionally, a lighting display 60 may be mounted to the lower surface 18 of the lower wall 24 of basket 12. Lighting panels, light emitting diodes (LEDs) or the like may be used to illuminate the ground below the basket 12 to provide desired aesthetic effects. Different colors and patterns of lights may be selected by the user through the first display 34 and operating under the control of the control module 52.

Figure 7:
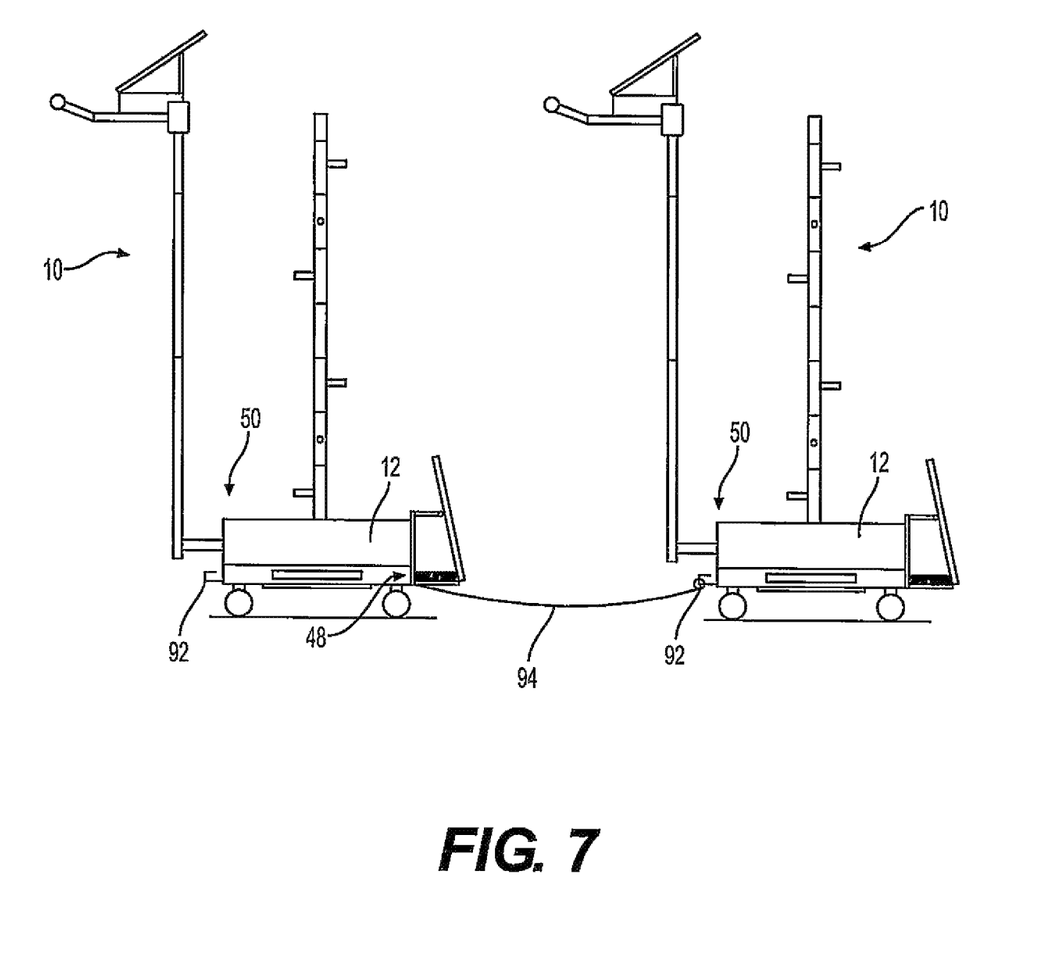
FIG. 7 is side view showing an alternative configuration of the smart shopping cart, showing two carts linked together.

Additionally, as shown in FIG. 7, each smart shopping cart 10 may be provided with hook 92, clasp or the like at the rear end 50 of the basket 12, allowing multiple smart shopping carts 10 to be connected by a cord 94 for easy transport of multiple carts 10. It should be understood that the smart shopping cart 10 may be provided with any desired additional components. For example, bar code scanners and tracking systems may be integrated into the smart shopping cart 10.

It is to be understood that the smart shopping cart is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A smart shopping cart, comprising:
   a basket having at least one sidewall, a lower wall, a front end, and a rear end;
   a plurality of motion sensors mounted on the basket, wherein the sensors are located at the at least one sidewall, the front end and the rear end;
   a plurality of ground-engaging wheels mounted on the lower wall of the basket;
   a hanger pole having opposed upper and lower ends, the lower end being mounted centrally on the lower wall of the basket, the hanger pole extending upward from the basket;
   at least one hanger mounted on the hanger pole;
   a telescopic support having opposed upper and lower ends, the lower end of the support being mounted at the rear end of the basket;
   a first display panel mounted on the upper end of the support;
   a second display panel pivotally mounted on the front end of the basket;
   a spring disposed between the second display panel and the front end of the basket thereby providing shock absorption to the second display panel in the event of a collision;
   a control module mounted to the basket, the control module being in electrical communication with at least each of the motion sensors, the first display panel and the second display panel; and
   a handle attached to the upper end of the support.

2. The smart shopping cart as recited in claim 1, further comprising a cup holder mounted on the upper end of the support.

3. The smart shopping cart as recited in claim 1, further comprising a receptacle mounted on the upper end of the support.

4. The smart shopping cart as recited in claim 1, further comprising a lighting display mounted on the lower wall of the basket.

* * * * *

UNITED STATES PATENT AND TRADEMARK OFFICE
CERTIFICATE OF CORRECTION

| | | |
|---|---|---|
| PATENT NO. | : 10,913,476 B1 | Page 1 of 1 |
| APPLICATION NO. | : 16/884965 | |
| DATED | : February 9, 2021 | |
| INVENTOR(S) | : Reem A M A M Alyaqout | |

It is certified that error appears in the above-identified patent and that said Letters Patent is hereby corrected as shown below:

On the Title Page

(71) Applicant:
Reem Amam Alyaqout
Should be:
Reem A M A M Alyaqout

(72) Inventor:
Reem Amam Alyaqout
Should be:
Reem A M A M Alyaqout

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*